(12) United States Patent
Hollingsworth et al.

(10) Patent No.: US 6,541,601 B1
(45) Date of Patent: *Apr. 1, 2003

(54) UNSATURATED SIDE CHAIN POLYAMIDE POLYMERS

(75) Inventors: Rawle I. Hollingsworth, Haslett, MI (US); Guijun Wang, Hamden, CT (US)

(73) Assignee: Board of Trustees of Michigan State University, East Lansing, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/995,234

(22) Filed: Nov. 27, 2001

(51) Int. Cl.$^7$ ............ C08G 69/08; C08G 69/26; C08G 69/28; C08G 73/10
(52) U.S. Cl. ............ 528/310; 528/318; 528/322; 528/332; 528/335; 528/336; 528/354; 528/363; 528/392; 528/422
(58) Field of Search ............ 528/310, 318, 528/332, 335, 336, 322, 363, 392, 422, 359

(56) References Cited

U.S. PATENT DOCUMENTS 6,194,529 B1   2/2000   Hollingsworth
6,153,724 A    11/2000  Hollingsworth

OTHER PUBLICATIONS

Villenave, E., et al, J. Phys. Chem. B 101 8513–8519 (1997).
Umemura, J., et al, J. Phys. Chem. 94 62–67 (1990).
Batchelder, D.N., et al., J. Am. Chem. Soc. 116 1050–1053 (1994).
Lando, J.B. in Polydiacetylens; Bloor, D., Chance, R., Eds: Nijhoff: Dordrechet, The Netherlands (1985).
Mowery, M.D., et al., Langmuir, 14 5594–5602 (1998).
KIm, T., et al., J. Am. Chem. Soc. 119 189–193 (1997).
Shirai, E., et al., J. Phys. Chem. B. 102 3765–3772 (1998).
Kim, T., et al., J. Am. Chem. Soc. 116 3963–3967 (1995).
Mowery, M.D., et al., J. Phys. Chem. B 101 8513–8519 (1997).
Saito, A., et al., Langmuir 12 3938–3944 (1996).
Charych, D.H., et al., Science 261 585–588 (1993).
Berman, A., et al, Science 269 616–618 (1995).
Mino, N., et al., Langmuir 8 594–598 (1992).
Green, B.I., et al., Science 247 679–687 (1990).
Sukwattanasinitt, M., et al., Chem. Matter 10 27–29 (1998).
Huggins, K.E., et al., Macromolecules 30 5305–5311 (1997).
Molyneux, S., et al., Optics Letters 18 2093–2095 (1993).
Sandstedt, C.A., et al., Chem. Mater 6 1346–1350 (1994).
Okada, S., et al., Acc. Chem. Res. 31 229–239 (1998).
Kuo, T., et al., J. Am. Chem. Soc. 110 7571–7572 (1988).
Dorn, I.T., et al., Langmuir 14 4836–4842 (1998).

*Primary Examiner*—P. Hampton-Hightower
(74) *Attorney, Agent, or Firm*—Ian C. McLeod (57) ABSTRACT

Polyamide polymers with side chains from a polyamide backbone, preferably containing carbon to carbon unsaturation which provides unique conductive and color change properties, are described. In particular, unsaturation is in the form of side chains from the polyamide backbone, with aligned diacetylene groups in each side chain which are aligned and in the same plane.

23 Claims, 8 Drawing Sheets

UNSATURATED SIDE CHAIN POLYAMIDE POLYMERS

BACKGROUND OF THE INVENTION (1) Field of the Invention

The present invention relates to novel polyamide compositions and to a process for synthesizing these compositions. The polymerization reaction is between a cyclic α,β-unsaturated lactone and a R-substituted amide moiety substituted alkylene amine of the formula:

R preferably has aligned diacetylene groups which provide a conductive polymer. Preferably, the polymer compositions are synthesized from 2 (5H)-furanone and the amine.

(2) Description of the Related Art

In the past, the desirable physical properties of organic polymers were relatively simple to evaluate. Of interest were ordinary attributes such as transparency, flexibility, heat and electrical conductance, water resistance, and pliability. These physical requirements could be met by any one of a wide variety of polymeric materials fabricated by one of several polymerizing reactions. These reactions include the polymerization of alkenes (e.g. polypropylene and polyvinylchloride), the condensation of acids and bases to form polyesters, or acids and amines to form polyamides.

More recently, there has been much effort to fabricate organic polymeric materials with more sophisticated properties. These include materials that can conduct electricity, that are magnetic, and materials that change some property, such as color or refractive index, under the influence of various external factors such as pressure, electric fields, magnetic fields, pH changes, or temperature alterations. In all of these applications, one critical requirement is that some functional group or groups along the polymer backbone be aligned in a regular repeating fashion with a very high density. Polymeric materials with very different properties can be made depending on the choice of the functional groups. Electron donor-acceptor pairs can be conductive or have optical properties that are influenced by electric or magnetic fields. Such polymeric materials have applications in sensor devices and optical switches. An array of negatively charged groups is a typical arrangement sought for conducting organic polymers where the charge carriers are metal ions and protons. Hydrogels can be formed if charges are present on the side chains. Materials with special conductive, magnetic or electro-optical properties can be fabricated from polymers having specialized aromatic side chains.

There are several methods for introducing side chains into a main chain polymer. One strategy is to add the side chains to the preformed main chain. This is generally not satisfactory because of the lack of predictability and reproducibility of stoichiometry, under-derivitization for stearic reasons, difficulty in accessing the interior of the polymer, poor solubility of the polymer, and inefficient coupling reactions. Alternatively, the desired side chain can be attached to each polymer monomer prior to chain formation. This method is generally more efficient but the subsequent coupling of the monomers often requires activating groups to be attached to one or both coupling sites. For example, the preparation of polyesters and polyamides require that the carboxylic acid function be activated before chain formation. Afterwards, the spent activating group has to be removed from the product. Radical polymerization cannot be used for side chains that contain unsaturations or heteroatoms such as sulfur which act as quenching agents for radicals. Furthermore, side chains containing reactive groups such as carboxylic acids often have to be protected before coupling. Finally, synthesis of most polymers is dependent on fossil fuels, which is a non-renewable resource that is rapidly being depleted, and is a major import product which affects the balance of trade.

Examples of polymers that are polyamides which can be synthesized from renewable resources are set forth below. U.S. Pat. No. 2,274,831 to Hill discloses polyamides and the preparation of polyamides by polymerizing amino acids containing as a heteroatom a tertiary amino nitrogen or by reacting diamines and dibasic acids, either or both of which contain a heteroatom of tertiary amino nitrogen. U.S. Pat. No. 2,691,643 to Chirtel et al discloses preparation of polypeptides of beta-alanine and amide forming derivatives of beta-alanine, beta-alanine alkyl esters, beta-alanine amides by self-condensation to produce water insoluble polypeptides which are useful for forming synthetic edible films. U.S. Pat. No. 2,786,045 to Chirtel et al discloses polymers of hydroxyacyl-amino acids and their polymers for the preparation of tough, elastic fibers and films. U.S. Pat. No. 2,968,629 to Thompson discloses a method of inhibiting metal corrosion using a condensation product of beta-lactone. U.S. Pat. No. 3,525,718 to Derieg et al discloses a process for producing a polyamide resin from beta-lactone. The process consists of reacting beta-lactone under anhydrous conditions at reduced temperatures to produce an amino acid addition product, and then in a subsequent step subjecting said product to polymerization conditions at elevated temperatures in which said product is substantially dehydrated to form a polyamide resin which is linear without side chains. The resin has properties that suggest it may be used in applications where nylon and Dacron have been used. All of the above mentioned inventions disclose process to make a specific product.

The proper alignment of the acetylene groups in long chain diacetylenes is one of the most difficult aspects of the fabrication of such materials. The acetylene functions need to be within a very defined distance of each other or separate chains with a tolerance of only 0.5 Angstroms. There are also quite strict requirements for the relative angles between diacetylene groups participating in the polymerization process (Villenave, E., et al., *J. Phys. Chem. B* 1997, 101, 8513–8519; Umemura, J., Kamata, T., Kuwai, T., Takenaka, T., *J. Phys. Chem.*, 1990, 94, 62–67; Batchelder, D. N., Evans, S. D., Freeman, T. L., Haussling, L., Ringsdorf, H., Wolf, H., *J. Am. Chem. Soc.* 1994, 116, 1050–1053; Lando, J. B. in Polydiacetylens; Bloor, D., Chance, R., Eds.: Nijhoff: Dordrechet, The Netherlands, 1985) in each chain. Several strategies have been tried in attempts to accomplish this, the most common one being to align the chains on a flat support such as a highly polished gold surface to form self assembled monolayers (Mowery, M. D., Menzel, H., Cai, M., Evans, C. E., *Langmuir*, 1998, 14, 5594–5602; Kim, T., Chan, K. C., Crooks, R. M., *J. Am. Chem. Soc.* 1997, 119, 189–193; Shirai, E., Urai, Y., Itoh, K. *J. Phys Chem. B* 1998, 102, 3765–3772; Kim, T., Crooks, R. M., Tsen, M., Sun, L., *J. Am. Chem. Soc.* 1995, 116, 3963–3967). The molecules are generally anchored to the surface via thiol groups. This method works well for saturated alkane thiols but there are some problems with alkyl chain containing diacetylene groups. Because of the large atomic radius of gold compared to carbon, variations in the surface of only a few gold atoms put the acetylene functions in the aligned chains out of register, thus terminating polymerization. It is therefore very difficult to obtain any high degree of conjugation. The substrate surface pretreatment also plays an important role in the degree of polymerization. This method is also extremely labor-intensive. Another shortcoming of the method is the tendency for the thiol to form disulfide bonds. When this happens, the chains are not aligned and polymerization is inhibited, with decreasing local and long range order (Mowery, M. D., Evans, C. E., *J. Phys. Chem. B* 1997, 101, 8513–8519; Mowery, M. D., Menzel, H., Cai, M., Evans, C. E., *Langmuir*, 1998, 14, 5594–5602). Thiols are also very prone to oxidation by air to give oxy-species that degrade the integrity of the films. Another drawback of films that are formed on metal supports is that they cannot be used for applications that require transmission of light.

Langmuir Blodgett technology presents another approach to generating monolayers of hydrocarbons containing polydiacetylene groups (Saito, A., Urai, Y., Itoh, K., *Langmuir* 1996 12, 3938–3944; Charych, D. H., Nagy, J. O., Spevak, W., Bednarski, M. D., *Science* 1993, 261, 585–588; Berman, A., Ahn, D. J., Lio, A., Salmeron, M., Reichert, A., Charych, D., *Science* 1995, 269, 515–518; Mino, N., Tamura, H., Ogawa, K., *Langmuir* 1992, 8, 594–598). This is an excellent method for preparing limited number of highly ordered films for experimental analyses and studies. It suffers from the drawback of being a very labor-intensive method. Langmuir Blodgett films are also not stabilized by covalent forces between the molecular units and therefore unstable to a variety of chemical or physical conditions. It is certainly not applicable for large scale commercial applications where films have to be packaged and must withstand shock and handling.

Polydiacetylenes have much potential as new organic materials in electrical conductivity, non-linear optical and near-infrared active applications (Green, B. I., Orenstein, J., Schmitt-Rink, S., *Science* 1990, 247, 679–687; Kim, W. H., Bihari, B., Moody, R., Kodali, N. B., Kumar, J., Tripathy, S. K., *Macromolecules* 1995, 28, 642–647; Sukwattanasinitt, M., Wang, X., Li, L., Jiang, X., Kumar, J., Tripathy, S. K., Sandman, D. J., *Chem. Mater* 1998, 10, 27–29; Huggins, K. E., Son, S., Stupp, S. I., *Macromolecules* 1997, 30, 5305–5311; Molyneux, S., Kar, A. K., Wherrett, B. S., Axon, T. L., Bloor, D., *Optics Letters*, 1993, 18, 2093–2095; Sandstedt, C. A., Eckhardt, C. J., Downey, M. J., Sandman, D. J., *Chem. Mater.* 1994, 6, 1346–1350). U.S. Pat. No. 6,194,529 to Hollingsworth and Wang describes polyacetylene compounds with improved properties which are not in the form of polymers. The fabrication of 2-dimensional systems in which the polyacetylene function occurs as a band sandwiched between two aliphatic layers are especially of interest (Okada, S., Peng, S., Spevak, W., Charych, D. *Acc. Chem. Res.* 1998, 31, 229–239; Kuo, T., O'Brien, D. F. *J. Am. Chem. Soc.* 1988, 110, 7571–7572; Charych, D. et al *Chem Biol.* 1996, 3, 113–120; Mullen, K., Rabe, J. P. *Mol. Elec. Sci. Tech.* 1998, 852, 205–218; Dorn, I. T., Hofmann, U. G., Peltonen, J., Tempe, R., *Langmuir*, 1998, 14, 4836–4842).

The polymerization process used in the present invention is generally described in U.S. Pat. No. 6,153,724 granted Nov. 28, 2000. This process provides the starting point for the present invention.

SUMMARY OF THE INVENTION

This invention is related to a process for the preparation of a polyamide polymer which comprises:

(a) reacting in a single step in a reaction mixture an α,β-unsaturated lactone and an amine of the formula:

wherein alkylene contains 1 to 50 carbon atoms and wherein amine in the formula is a moiety selected from the group consisting of —$NH_2$ and —$NH_3^+$ and mixtures thereof and wherein each of the R can be the same or different and contain 1 to 50 carbon atoms; and

(b) separating the polyamide polymer from the reaction mixture, wherein multiple groups are in vertically aligned spaced relationship along a polyamide backbone.

The present invention particularly relates to a process for the preparation of a polyamide polymer which comprises:

(a) reacting in a single step in a reaction mixture α,β-unsaturated lactone and an amine of the formula wherein amine in the formula is a moiety selected from the group consisting of —$NH_2$ and —$NH_3^+$ and mixtures thereof, wherein each of the R can be the same or different and contain 1 to 50 carbon atoms to produce a polyamide polymer in the reaction mixture of the formula;

wherein n is between about 1 and 50; and
(b) separating the polyamide polymer from the reaction mixture, wherein multiple of R— have at least some adjacent carbon atoms with unsaturation which are aligned adjacent to each other.

This invention is further related to a polyamide prepared by reacting α,β-unsaturated lactone with an R— substituted amide moiety substituted alkylene amine of the formula wherein alkylene contains 1 to 50 carbon atoms and wherein amine in the formula selected from the group consisting of —NH$_2$ and —NH$_3^+$ and mixtures thereof, wherein multiple of the R are in vertically aligned and spaced relationship along a polyamine backbone, wherein each of the R can be the same or different and contain 1 to 50 carbon atoms and optionally are positively or negatively charged.

Also, this invention is related to a polyamide of the formula:

wherein n is between about 1 and 50, wherein R contains between 1 and 50 carbon atoms and is optionally substituted with heteroatoms O, N, S, and P and combinations thereof which allow the formation of a polyamide polymer wherein each of the R can be the same or different and contain 1 to 50 carbon atoms, and wherein R can be positively or negatively charged.

OBJECTS

It is an object of the present invention to provide polyamide polymers with side chains, preferably having carbon to carbon unsaturation, derived from α,β-unsaturated lactones and an R amide moiety substituted alkylene amine of the formula Another object of the present invention is to provide polyamide polymer compositions and a process for preparing them wherein R is formed with aligned diacetylene groups suitably positioned for polymerization.

A further object of the present invention is to provide polymer compositions which are economical to prepare.

These and other objects will become increasingly apparent by reference to the following description and the drawings.

BRIEF DESCRIPTION OF THE DRAWINGS

Figure Legends

DESCRIPTION OF PREFERRED EMBODIMENTS

EXAMPLE I

The polymer was prepared in two stages (Scheme 1).

A long chain fatty acid (10,12-Pentacosidynoic acid) containing the diacetylene function was activated for integration into the polymer by first attaching it to a short chain diamine (1,3-diaminopropane) to form the R amide.

All reactions and workups relating to diacetylenic compounds were conducted with exclusion of light. Amberized glassware was used and samples were covered with aluminum foil. A photography safe light was used for illumination when conducting chromatographic separations. 10,12-Pentacosadiynoic acid 0.94 g (0.0025 mol), oxalyl chloride 5 ml (0.054 mol), and dry dichloromethane 10 ml, were mixed and stirred under a dry atmosphere overnight at room temperature. The solvent and excess oxalyl chloride were quickly removed under reduced pressure by rotatory evaporation. The product and chloride were taken up in 5 ml hexane and rotatory evaporated to dryness to remove the last traces or oxalyl chloride. The acid chloride (0.0025 mol) dissolved in 5 ml of dry dichloromethane was added to a solution of diaminopropane (0.6 g, 0.008 mol) in dichloromethane with a dropping funnel over a 10 minute period. The reaction mixture was then stirred for 24 hours with protection from moisture. The residue was taken up in chloroform, washed sequentially with 0.1 N HCl, saturated sodium, bicarbonate solution, and then brine and the organic phase was separated and dried with anhydrous sodium sulfate. Removal of the solvent yielded the product which was purified by flash column chromatography (methanol:chloroform=1:3). It was obtained as a white powder (yield 0.86 g, 80%), $^1$H-NMR (300 MHz, CDCl$_3$) 6.22 (s(broad), 1H), 3.34 (q, J=6.0 Hz, 2H), 2.78 (t, J=6.3 Hz, 2H), 2.24–2.10(m, 6H), 1.64–1.20 (m, 34H) 0.86 (m, 3H) IR (NaCl, CHCl$_3$) 3296, 2918, 2849, (2176, 2140 weak), 1700, 1639, 1553, 1463, 722 cm$^{-1}$.

The amino-terminated diacetylene was then added to 2(5H)-furanone to form the polyamide. The amine (0.59 g, 1.42 mmol) was added to 0.12 g (1.42 mmol) 2 (5H)-furanone in a mixture of ethanol (3 ml) and chloroform (7 ml). The mixture was stirred for 12 hours at room temperature, then at 50° C. for another 6 hours until all the solvent had evaporated. The oligo-amide was obtained as a green crystalline solid. Further heating for 10 hours gave the polymer: $^1$H NMR, (300 MHz, CDCl$_3$ The signals were significantly broadened and several practically disappeared as is characteristic of polymer spectra). 3.25 ppm (m, broad), 2.40–2.20 (m), 1,59 (m), 1.49(m), 1.23 (m), 0.86 (m). IR (CHCl$_3$), 3310, 3079, 2919, 2850, 1771, 1638, 1544, 1470, 1421, 718.

Figure 1A:
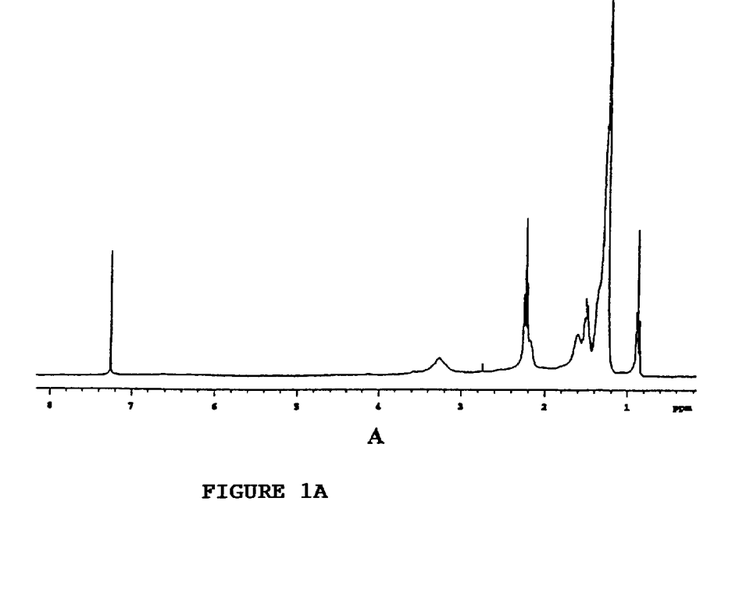
FIG. 1A is a graph of the polyamide polymer of Example 1 showing 300 MHZ $^1$H-NMR spectrum of the polymer.
Figure 1B:
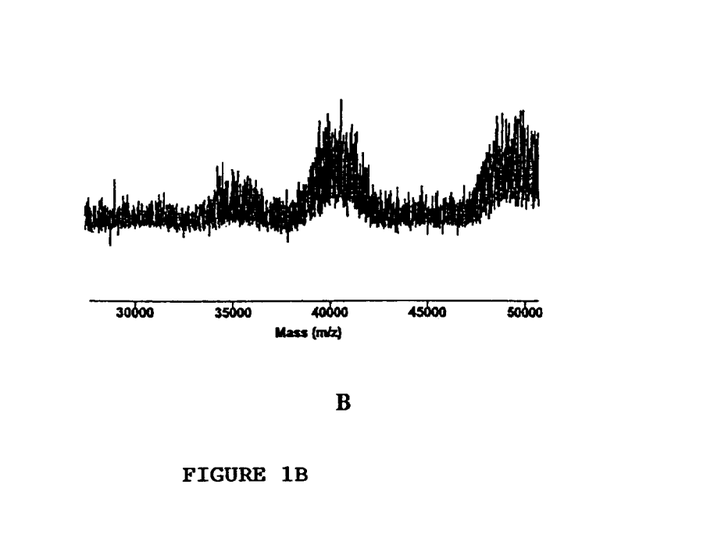
FIG. 1B is a graph showing a high mass region of a MALDI mass spectrum.
Figure 1C:
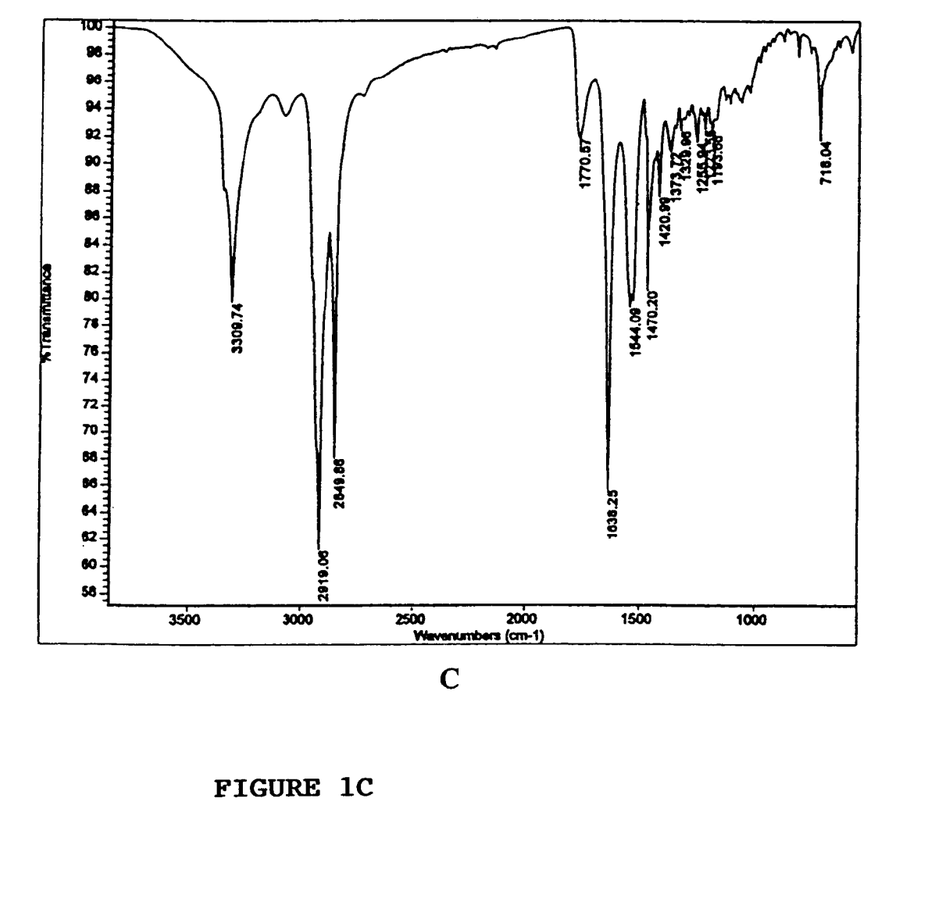
FIG. 1C is a graph showing Mid-IR spectrum signals due to the hydroxyl group, alkane chains and amide carbonyl stretch.
Figure 2A:
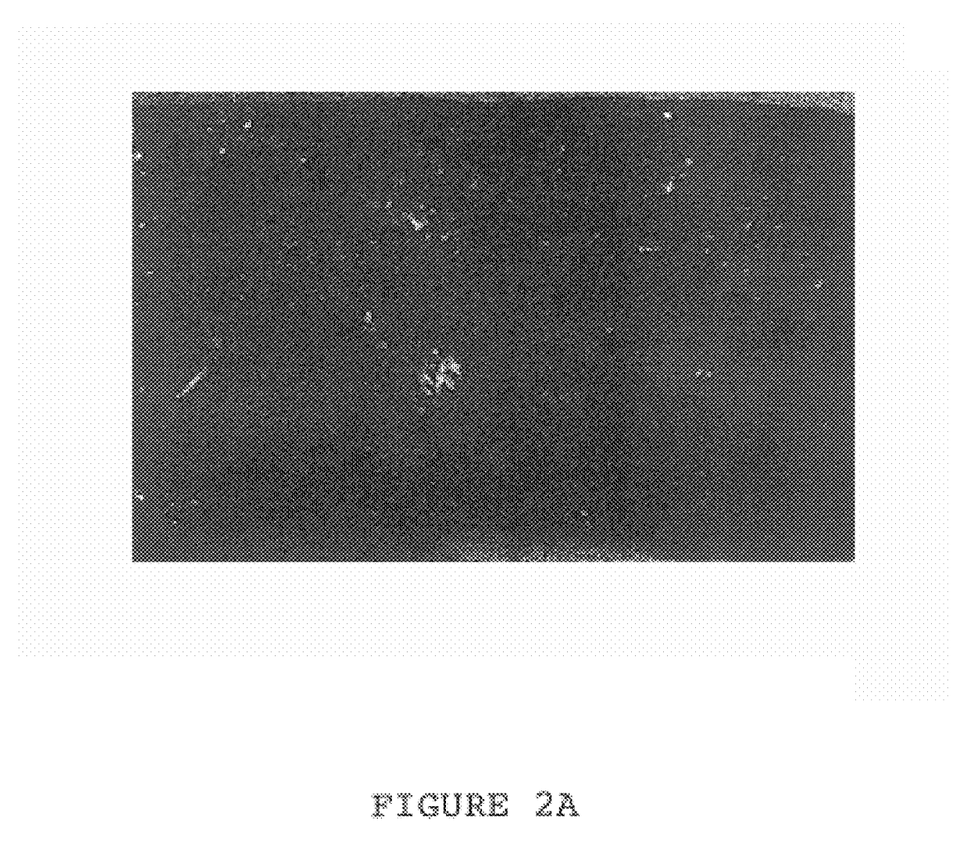
FIG. 2A is a photograph of the polymeric solid of Example 1 after UV (254 nm) irradiation for 10 minutes.
Figure 2B:
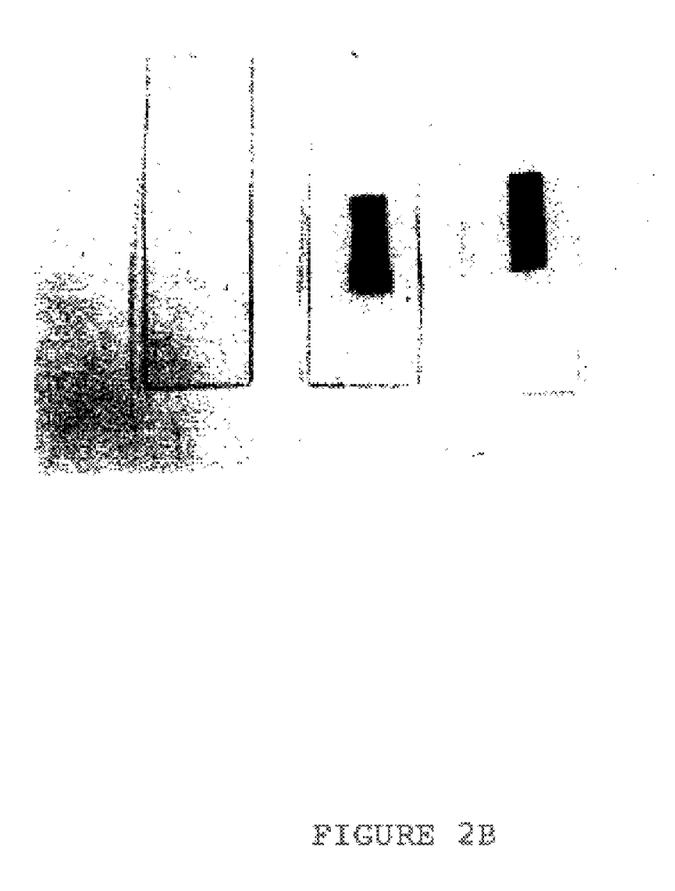
FIG. 2B (left) is a photograph of a film formed by the polymeric solid on a glass slide (colorless strip, Center) a similar film after irradiation by UV light for 7 minutes produces a the blue color (Right). A blue irradiated film heated to 80° C. and photographed while still hot was red in color (left). The irradiated film reverts to blue on cooling.
Figure 2C:
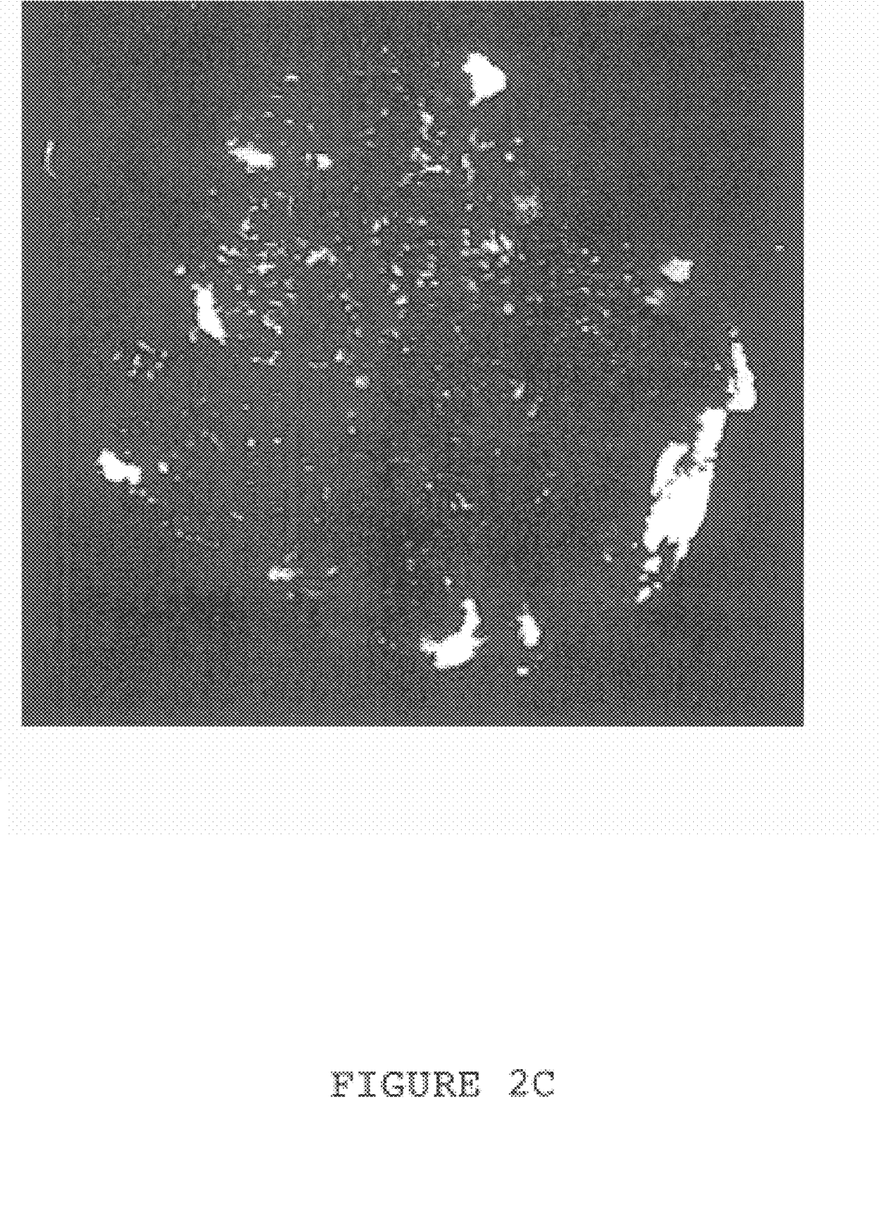
FIG. 2C is a photograph of the polymer upon treating with UV for 10 minutes and then doping with iodine to react with the unsaturated carbons. The film had a bluish-white iridescence. This color was lost over a few days presumably because of air oxidation.
Figure 3A:
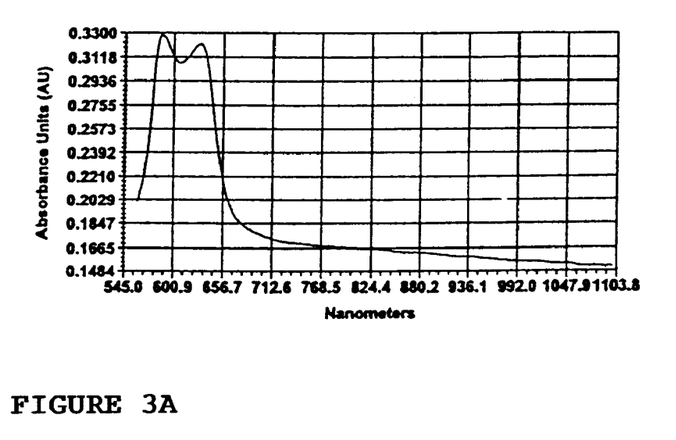
FIGS. 3A and 3B are graphs of near IR spectra of the polymer of Example 1.
Figure 3B:
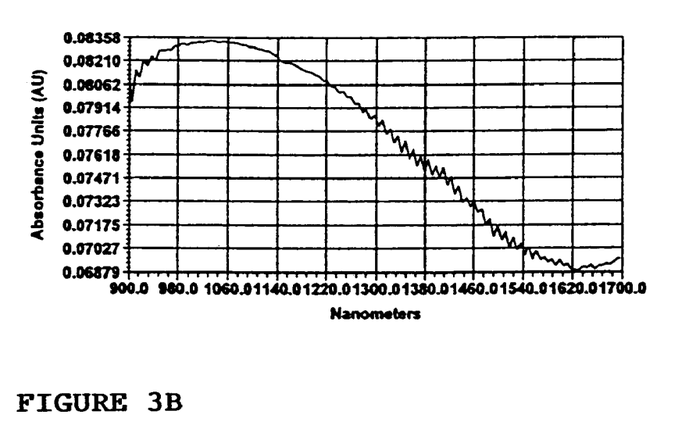
Figure 4:
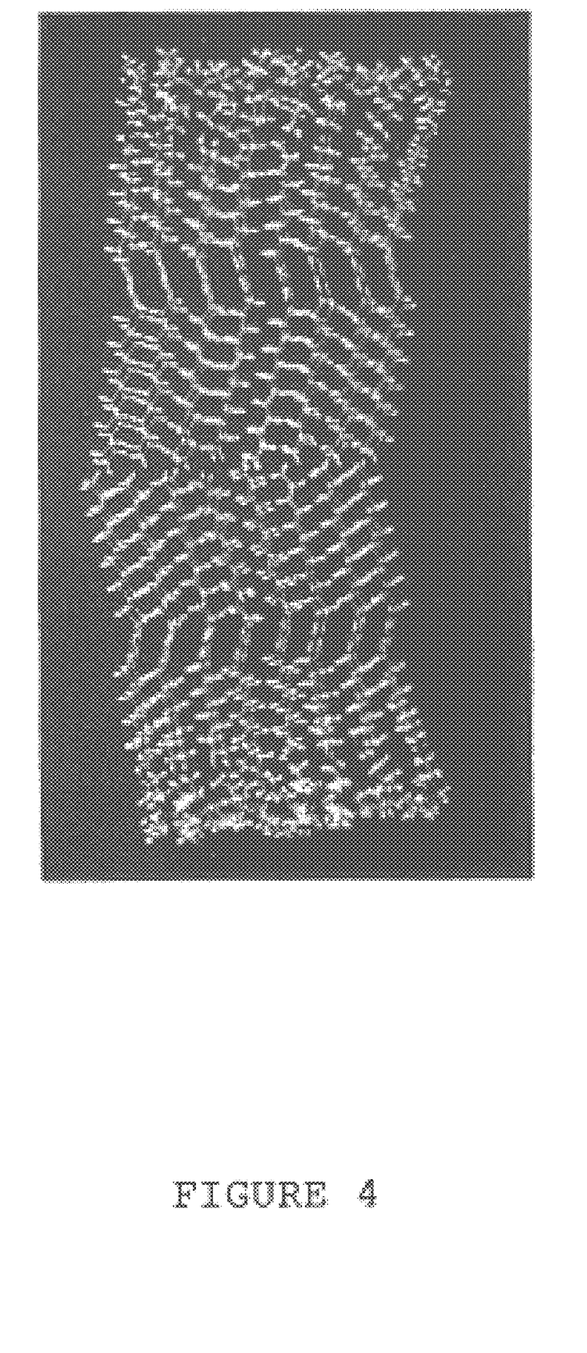
FIG. 4 is a computer vector model showing the packing structure of the polymer of Example 1 in a bilayer-type arrangement. Note the polar top surface.
Figure 5A:
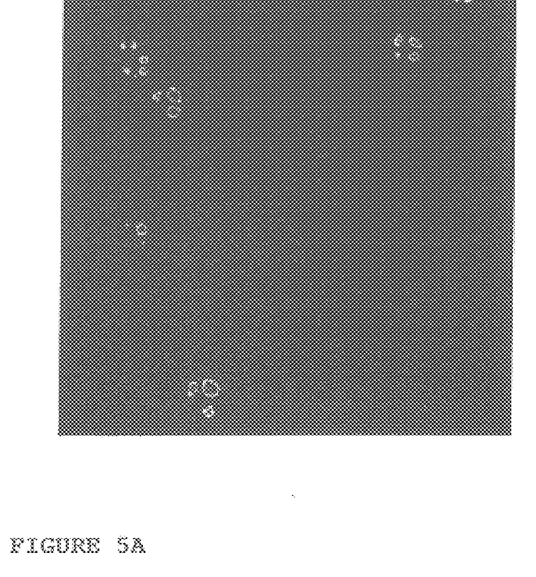
FIG. 5A is a laser confocal micrograph (using confocal optics) of a polymer film prepared from the polymer of Example 1 deposited from an ethanol/water mixture.
Figure 5B:
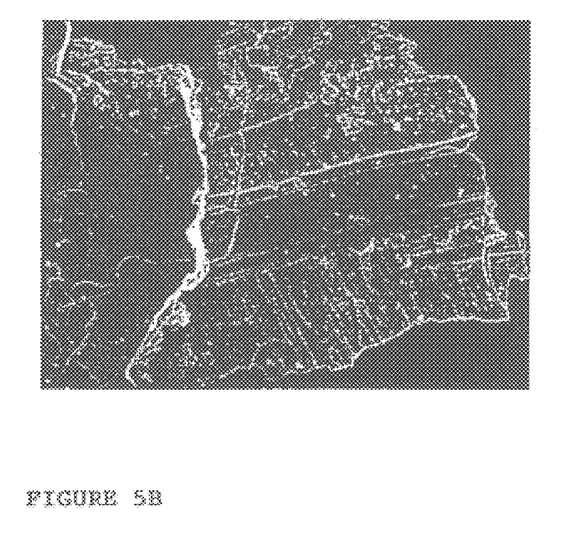
FIG. 5B is a scanning electron micrograph of the polymer sputter coated with gold.

The polymers were characterized by proton NMR matrix-assisted laser desorption mass spectrometry (spectroscopy FIG. 1A, FIG. 1B) which ascertained that its mass is greater than 50,000 Daltons and infrared spectroscopy (FIG. 1C). The material had a deep blue appearance characteristic of polydiacetylenes after exposure to light (FIG. 2A). A thin film of the material was colorless before UV irradiation but turned blue after and then to red after heating to above 60° C. (FIG. 2B). The thermal red to blue transition was reversible. The blue material became metallic gold in appearance on doping with iodine (FIG. 2C) indicating the presence of free electrons and a conducting state. The UV-irradiated polymer was active in the near IR unlike the other polydiacetylenes that have been reported on thus far (FIG. 3). A computer model of the packed structure is shown in FIG. 4. A polarized light micrograph showing the "Maltese cross" motif found in lamellar systems is shown in FIG. 5A and a scanning electron micrograph showing a stacked layer arrangement for the dry polymer is shown in FIG. 5B. In principle these layers can be peeled and used in various applications.

It is intended that the foregoing description be only illustrative of the present invention and that the present invention be limited only by the hereinafter appended claims.

We claim:

1. A process for the preparation of a polyamide polymer which comprises:

(a) reacting in a single step in a reaction mixture an α,β-unsaturated lactone and an amine of the formula:

wherein alkylene contains 1 to 50 carbon atoms and wherein amine in the formula is a moiety selected from the group consisting of —NH$_2$ and —NH$_3^+$ and mixtures thereof and wherein each of the R are optionally the same or different and contain 1 to 50 carbon atoms; and (b) separating the polyamide polymer from the reaction mixture, wherein multiple groups are in vertically aligned spaced relationship along a polyamide backbone.

2. The process of claim 1 wherein the R— are selected from the group consisting of alkyl, alkenyl, alkynyl, cycloalkyl, aryl and aralkyl optionally containing amine, phosphonium, hydroxyl, nitrile, carboxyl, substituents, sulfate, phosphate, sulfonyl, trialkylammonium or halogen and combinations thereof.

3. The process of claim 1 wherein alkylene contains 1 to 8 carbon atoms.

4. The process of claim 2 wherein the reaction is conducted in absence of a solvent for the amine.

5. The process of claim 2 wherein the reaction is conducted in the presence of a solvent for the amine.

6. The process of claim 5 wherein the solvent is a mixture of ethanol and chloroform.

7. The process of claim 1 wherein all of the R are the alkynyl containing 9 to 30 carbon atoms.

8. The process of claim 2 wherein R— contains heteroatoms selected from O, N, S and P.

9. A process for the preparation of a polyamide polymer which comprises:

(a) reacting in a single step in a reaction mixture α,β-unsaturated lactone and an amine of the formula wherein amine in the formula is a moiety selected from the group consisting of —NH$_2$ and —NH$_3^+$ and mixtures thereof, wherein each of the R are optionally the same or different and contain 1 to 50 carbon atoms to produce a polyamide polymer in the reaction mixture of the formula;

wherein n is between about 1 and 50; and (b) separating the polyamide polymer from the reaction mixture, wherein multiple of R— have at least some adjacent carbon atoms with unsaturation which are aligned adjacent to each other.

10. The process of claim 9 wherein R— are selected from the group consisting of alkyl, alkenyl, alkynyl, cycloalkyl, aryl and aralkyl optionally containing amine, phosphonium, hydroxyl, nitrile, carboxyl, substituents, sulfate, phosphate, sulfonyl, trialkylammonium or halogen and combinations thereof.

11. The process of claim 10 wherein the reaction is conducted in absence of a solvent for the amine.

12. The process of claim 10 wherein the reaction is conducted in the presence of a solvent for the amine.

13. The process of claim 12 wherein the solvent is ethanol and chloroform.

14. The process of claim 9 wherein all of the R are the alkynyl containing 9 to 30 carbon atoms.

15. The process of claim 9 wherein R contains heteroatoms selected from the group consisting of O, N, S and P.

16. A polyamide prepared by reacting α,β-unsaturated lactone with an R— substituted amide moiety substituted alkylene amine of the formula wherein alkylene contains 1 to 50 carbon atoms and wherein amine in the formula selected from the group consisting of —NH$_2$ and —NH$_3^+$ and mixtures thereof, wherein multiple of the R are in vertically aligned and spaced relationship along a polyamine backbone, wherein each of the R are optionally the same or different and contain 1 to 50 carbon atoms and optionally are positively or negatively charged.

17. The polyamide of claim 16 wherein in addition to the R— are selected from the group consisting of alkyl, alkenyl, alkynyl, cycloalkyl, aryl and aralkyl optionally containing amine, phosphonium, hydroxyl, nitrile, carboxyl, substituents, sulfate, phosphate, sulfonyl, trialkylammonium or halogen and combinations thereof.

18. The polyamide of claim 17 wherein alkylene contains 1 to 8 carbon atoms.

19. The polyamide of claim 17 wherein all of R— are alkynyl.

20. A polyamide of the formula:

wherein n is between about 1 and 50, wherein R contains between 1 and 50 carbon atoms and is optionally substituted with heteroatoms O, N, S, and P and combinations thereof which allow the formation of a polyamide polymer wherein each of the R can be the same or different and contain 1 to 50 carbon atoms, and wherein R can be positively or negatively charged.

21. The polyamide of claim 20 wherein R are selected from the group consisting of alkyl, alkenyl, alkynyl, cycloalkyl, aryl and aralkyl optionally containing amine, phosphonium, hydroxyl, nitrile, carboxyl, substituents, sulfate, phosphate, sulfonyl, trialkylammonium or halogen and combinations thereof.

22. The polyamide of claim 20 wherein R— is 10,12-pentacosidyl.

23. The process of claim 9 wherein R— is 10,12-pentacosidyl.

* * * * *

UNITED STATES PATENT AND TRADEMARK OFFICE
CERTIFICATE OF CORRECTION

PATENT NO. : 6,541,601 B1  Page 1 of 1
DATED : April 1, 2003
INVENTOR(S) : Rawle I. Hollingsworth and Guijun Wang It is certified that error appears in the above-identified patent and that said Letters Patent is hereby corrected as shown below:

Column 1,
Line 13, (in the structure), "NH" should be -- $NH_2$ --.

Column 5,
Line 27, (in the structure), "Alkyene" should be -- Alkylene --.

Column 6,
Line 5, (in the structure), "NH" should be -- $NH_2$ --.

Column 11,
Line 4, (in the structure), "Alkyene" should be -- Alkylene --.
Line 8, (in the structure), "C=O," should be -- C = O --.

Column 12,
Line 20, "30" should be deleted.
Line 44, (in the structure), "Alkyene" should be -- Alkylene --.

Signed and Sealed this

Nineteenth Day of August, 2003

JAMES E. ROGAN
*Director of the United States Patent and Trademark Office*